(12) United States Patent
Fujiwara

(10) Patent No.: US 8,842,189 B2
(45) Date of Patent: *Sep. 23, 2014

(54) MOVING IMAGE CAPTURE APPARATUS AND MOVING IMAGE CAPTURE METHOD

(75) Inventor: Yuya Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,802

(22) Filed: Dec. 14, 2011

(65) Prior Publication Data

US 2012/0081565 A1 Apr. 5, 2012

Related U.S. Application Data

(63) Continuation of application No. 12/106,019, filed on Apr. 18, 2008, now Pat. No. 8,094,202.

(30) Foreign Application Priority Data

May 17, 2007 (JP) .................................. 2007-132087
May 17, 2007 (JP) .................................. 2007-132088

(51) Int. Cl.
*G06K 9/46* (2006.01)
*G06K 9/66* (2006.01)
*H04N 5/225* (2006.01)
*G11B 27/28* (2006.01)
*H04N 5/77* (2006.01)
*H04N 9/79* (2006.01)
*H04N 5/85* (2006.01)
*H04N 9/82* (2006.01)

(52) U.S. Cl.
CPC .............. *H04N 5/772* (2013.01); *H04N 9/7921* (2013.01); *H04N 5/85* (2013.01); *H04N 9/8227* (2013.01); *G11B 27/28* (2013.01); *H04N 9/8205* (2013.01)

USPC ......... 348/220.1; 382/190; 382/191; 382/192

(58) Field of Classification Search
USPC ................. 382/190–208; 348/220.1; 715/838
See application file for complete search history.

(56) References Cited

U.S. PATENT DOCUMENTS

| 6,035,061 | A | * | 3/2000 | Katsuyama et al. | 382/177 |
| 6,563,949 | B1 | * | 5/2003 | Takebe | 382/190 |
| 2003/0068087 | A1 | * | 4/2003 | Wu et al. | 382/190 |
| 2003/0095720 | A1 | * | 5/2003 | Chiu et al. | 382/284 |
| 2007/0237376 | A1 | * | 10/2007 | Yoshida | 382/128 |
| 2008/0025618 | A1 | * | 1/2008 | Minagawa et al. | 382/229 |

FOREIGN PATENT DOCUMENTS

| JP | 07-192003 A | 7/1995 |
| JP | 2000-350124 A | 12/2000 |
| JP | 2004-070427 A | 3/2004 |

\* cited by examiner

*Primary Examiner* — Timothy J Henn
*Assistant Examiner* — Pritham Prabhakher
(74) *Attorney, Agent, or Firm* — Canon U.S.A., Inc. IP Division

(57) ABSTRACT

A moving image capture apparatus generates a data file to record, on a recording medium, an image signal output from an imaging unit, extracts character information from the image signal to be recorded on the recording medium, sets a parameter value used for selection as a file name according to a characteristic of appearance of the character information, calculates an evaluation value from the set parameter value, and sets character information based on the calculated evaluation value as a file name of the image signal. Furthermore, the moving image capture apparatus generates a thumbnail of the file based on an image signal from which character information for which the calculated evaluation value is relatively large has been extracted.

8 Claims, 17 Drawing Sheets

SCENE 1 AAAAA
SCENE 4 BBBBB
SCENE 2 CCCCC
SCENE 3 DDDDD
．
．
．
．

MOVING IMAGE CAPTURE APPARATUS AND MOVING IMAGE CAPTURE METHOD

CROSS-REFERENCE TO RELATED APPLICATIONS

This application is a continuation of application Ser. No. 12/106,019, filed on Apr. 18, 2008, which claims priority from Japanese Patent Application No. 2007-132087 filed May 17, 2007 and Japanese Patent Application No. 2007-132088 filed May 17, 2007, which are hereby incorporated by reference herein in their entirety.

BACKGROUND OF THE INVENTION

1. Field of the Invention

The present invention relates to a moving image capture apparatus and a moving image capture method. More specifically, the present invention relates to a method for adding a file name to each of a plurality of files, which enables a user to easily recognize content thereof. Furthermore, the present invention relates to a method for appropriately setting an image selectively captured by a user as a thumbnail image.

2. Description of the Related Art

A conventional moving image capture apparatus, such as a video camera, includes an electronic device, such as a charge-coupled device (CCD) or a complementary metal oxide semiconductor (CMOS). Such a conventional moving image capture apparatus outputs visual information captured by an image sensor constituted by the above electronic device, as an image signal. Furthermore, a conventional moving image capture apparatus generates a predetermined data file based on an output image file, and then records the generated data file on a recording unit, such as a hard disk drive (HDD), a digital versatile disc (DVD), or a semiconductor memory.

Visual information captured by such an image sensor is generally a still image. In this regard, a conventional moving image capture apparatus serially records still image signals utilizing a function of general image sensors for generating still images at a rate of several tens of frames per second. Thus, a conventional moving image capture apparatus can record a moving image using the above-described image sensor.

Meanwhile, in recent years, a recording unit has a larger recording capacity than ever because of a rapidly-increasing memory capacity. Here, a conventional moving image capture apparatus displays a list of moving image file identification names (hereinafter simply referred to as a "file name") on its image display unit, thus allowing a user to confirm data recorded in a recording unit as a file. Thus, a user can operate an operation unit of the moving image capture apparatus to find and select a desired file name.

Generally, a conventional moving image capture apparatus uses, for a file name, a character string that is mechanically generated based on a shooting date and time or a consecutive number. For example, Japanese Patent Application Laid-Open No. 2003-037770 discusses a moving image capture apparatus that extracts character information from an image signal to recognize a character string and sets the thus recognized character string as a file name, thus facilitating managing image files.

Another conventional method automatically extracts a character region from a color image signal acquired from visual information captured by an image sensor. For example, Japanese Patent Application Laid-Open No. 2001-283153 discusses a pattern extraction apparatus that uses a determination unit for determining whether a background color is even and extracts a character string with a high level of accuracy.

Furthermore, Japanese Patent Application Laid-Open No. 09-134406 (corresponding to U.S. Pat. No. 6,035,061) discusses a method for selecting and extracting one file name from among a document, which includes a plurality of character strings. The method discussed in Japanese Patent Application Laid-Open No. 09-134406 (corresponding to U.S. Pat. No. 6,035,061) uses at least one of conditions including a position of a character string, a character string size, whether an underline is added to a character string, whether a frame is added to a character string, and a positional relationship of a character string with another character. Furthermore, the method discussed in Japanese Patent Application Laid-Open No. 09-134406 (corresponding to U.S. Pat. No. 6,035,061) includes a file name extraction unit that assigns a point to a character region in which each character string exists, performs character recognition on a character region having a high point, and sets the recognized character string as a file name.

Meanwhile, a recording capacity of a recording unit has increased because of an increase in a memory capacity, as described above. In this regard, conventional methods have been developed and introduced for allowing a user to easily search for an image file in a case where many moving image files are recorded on a recording medium. For example, a conventional moving image capture apparatus displays, on its image display unit, a list of digest images (hereinafter referred to as "thumbnails"), which can be obtained by compressing one image representing content of a moving image file.

With respect to based on which image in a moving image file a thumbnail is to be generated, Japanese Patent Application Laid-Open No. 11-313316 discusses a method of using an intraframe-coded image that exists at a position later than a first image by a predetermined length of time to generate a thumbnail. However, the moving image capture apparatus discussed in Japanese Patent Application Laid-Open No. 11-313316 cannot assure that the generated thumbnail is one significant image that represents content of a moving image file.

That is, with the moving image capture apparatus discussed in Japanese Patent Application Laid-Open No. 11-313316, the image positioned later than a first image by a predetermined length of time may be an image that does not represent content of a moving image file at all (for example, a solid (black-out) image). Furthermore, in the case of a conventional moving image capture apparatus, an area of a screen of its display unit is limited, and a plurality of thumbnail images is displayed thereon. Accordingly, the size of each thumbnail is restricted to a small size to some extent. Thus, with such a conventional method, it is not easy for a user to recognize content of a moving image file represented by a thumbnail image. Accordingly, it is not easy for a user to correctly select a desired thumbnail image.

In this regard, Japanese Patent Application Laid-Open No. 2005-020351 discusses a video reproduction apparatus that acquires character data from caption information and audio information, as well as from a thumbnail image. The video reproduction apparatus discussed in Japanese Patent Application Laid-Open No. 2005-020351 selects and acquires character data from the acquired caption information and audio information. Furthermore, the video reproduction apparatus discussed in Japanese Patent Application Laid-Open No. 2005-020351 displays the acquired character data together with and at the same time as the selected thumbnail image to allow a user to easily recognize content of a moving image file represented by a thumbnail image.

Moreover, Japanese Patent Application Laid-Open No. 2002-027363 discusses a thumbnail generating apparatus that includes a character recognition unit for analyzing image data and selecting an image having character information and a thumbnail selection unit for generating a thumbnail image based on the image selected by the character recognition unit. The thumbnail generating apparatus discussed in Japanese Patent Application Laid-Open No. 2002-027363 generates a thumbnail based on an image having a character string of a size larger than a predetermined size, thus allowing a user to easily recognize content of a moving image file represented by a thumbnail image.

However, the above-described conventional moving image capture apparatus, such as the apparatus discussed in Japanese Patent Application Laid-Open No. 2003-037770, one character string to be set as a file name cannot be selected from among a plurality of character strings.

The pattern extraction apparatus discussed in Japanese Patent Application Laid-Open No. 2001-283153 extracts a file name of a still image. Accordingly, the pattern extraction apparatus discussed in Japanese Patent Application Laid-Open No. 2001-283153 does not consider time-axis matters, and thus cannot appropriately set a character string that has been intentionally captured by a user at the time of shooting a moving image as a file name.

The digital camera discussed in Japanese Patent Application Laid-Open No. 09-134406 (corresponding to U.S. Pat. No. 6,035,061) captures a series of scenes from a start of shooting to its end as one file, divides the file after the shooting operation has ended, and performs an edition operation for appropriately arranging the divided files. In this case, a conventional method, in dividing one single file into a plurality of files, uses a file name generated in a mechanical manner by adding a consecutive number to a name of the single file. Accordingly, with such a conventional method, a user cannot recognize content of the file based on the file name after the order of the divided files has been arranged. Thus, a user is required to take the trouble of verifying content of each image file.

With the video reproduction apparatus discussed in Japanese Patent Application Laid-Open No. 2005-020351, a user is required to perform processing for appropriately selecting a character string from among a large amount of character data acquired from caption information and audio information separately from processing for selecting a thumbnail image. In order to perform such processing, a user is required to verify a large amount of image data. Thus, with this conventional method, a user is required to perform a complicated operation for generating a thumbnail image.

In the case of the thumbnail generating apparatus discussed in Japanese Patent Application Laid-Open No. 2002-027363, when a character string of a size larger than a predetermined size is included in a plurality of scenes, a plurality of images is generated to serve as an image based on which to generate a thumbnail image. Accordingly, the thumbnail generating apparatus discussed in Japanese Patent Application Laid-Open No. 2002-027363 cannot appropriately set an image selectively captured by a user as a video image representing content of a moving image file as a thumbnail image.

SUMMARY OF THE INVENTION

An embodiment of the present invention is directed to an apparatus configured, in shooting a moving image having a plurality of scenes, to assign a file name with which a user can easily recognize content of the moving image and to appropriately set an image selectively captured by a user as a thumbnail image.

According to an aspect of the present invention, a moving image capture apparatus includes an imaging unit configured to capture visual information to output an image signal, a file generation unit configured to generate a data file to record the image signal output from the imaging unit on a recording medium, a character recognition unit configured to extract character information from the image signal to be recorded on the recording medium, a parameter value setting unit configured to set a parameter value related to a time axis used for selection as a file name according to a characteristic of appearance of the character information extracted by the character recognition unit within a file, an evaluation value calculation unit configured to calculate an evaluation value from the parameter value set by the parameter value setting unit, and a file name setting unit configured to set character information based on the evaluation value calculated by the evaluation value calculation unit as a file name of the image signal.

According to another aspect of the present invention, a method includes capturing visual information to output an image signal, generating a data file to record the output image signal on a recording medium, extracting character information from the image signal to be recorded on the recording medium, setting a parameter value related to a time axis used for selection as a file name according to a characteristic of appearance of the extracted character information within a file, calculating an evaluation value from the set parameter value, and setting character information based on the calculated evaluation value as a file name of the image signal.

According to yet another aspect of the present invention, a moving image capture apparatus includes an imaging unit configured to capture visual information to output an image signal, a file generation unit configured to generate a data file to record the image signal output from the imaging unit on a recording medium, a character recognition unit configured to extract character information from the image signal, a parameter value setting unit configured to set a parameter value related to a time axis according to a characteristic of appearance of the character information extracted by the character recognition unit within a file, an evaluation value calculation unit configured to calculate an evaluation value from the parameter value set by the parameter value setting unit, and a thumbnail generation unit configured to generate a thumbnail of the file based on an image signal from which character information for which the calculated evaluation value is relatively large has been extracted.

According to yet another aspect of the present invention, a method includes capturing visual information to output an image signal, generating a data file to record the output image signal on a recording medium, extracting character information from the image signal, setting a parameter value related to a time axis according to a characteristic of appearance of the extracted character information within a file, calculating an evaluation value from the set parameter value, and generating a thumbnail of the file based on an image signal from which character information for which the calculated evaluation value is relatively large has been extracted.

According to an exemplary embodiment of the present invention, a parameter value used for selection as a file name is set according to a characteristic of appearance of the extracted character information, and the character information and the parameter value are recorded as a pair on the recording medium. Accordingly, a user can easily select one character string from among a plurality of character strings appearing one after another during shooting a moving image and set the selected character string as a file name.

According to an exemplary embodiment of the present invention, a user can change a definition indicating an appropriateness as a file name. Accordingly, the user can more correctly select and set a character string selectively captured as a file name.

According to an exemplary embodiment of the present invention, in the case where a user has shot a series of scenes from the start of shooting and to its end as one file and divides the file into a plurality of files after the shooting operation has ended, a new file name acquired as a result of the character recognition can be added to the files obtained as a result of the division. Accordingly, the user can easily recognize content of the file without taking the trouble of closely verifying the content of the file, even in the case where the order of the files that have been obtained as a result of the division is rearranged.

According to an exemplary embodiment of the present invention, the character information and the parameter value are recorded as a pair on the recording medium, and a parameter value indicating a characteristic of appearance of the character information is set. At this time, the parameter value is set using at least one of parameters including the detection timing, the detection time length, the detection frequency, the character string size, the position of the character string on the screen, and the character string recognition accuracy. Thus, the user can appropriately set an image that has been selectively captured as a thumbnail image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
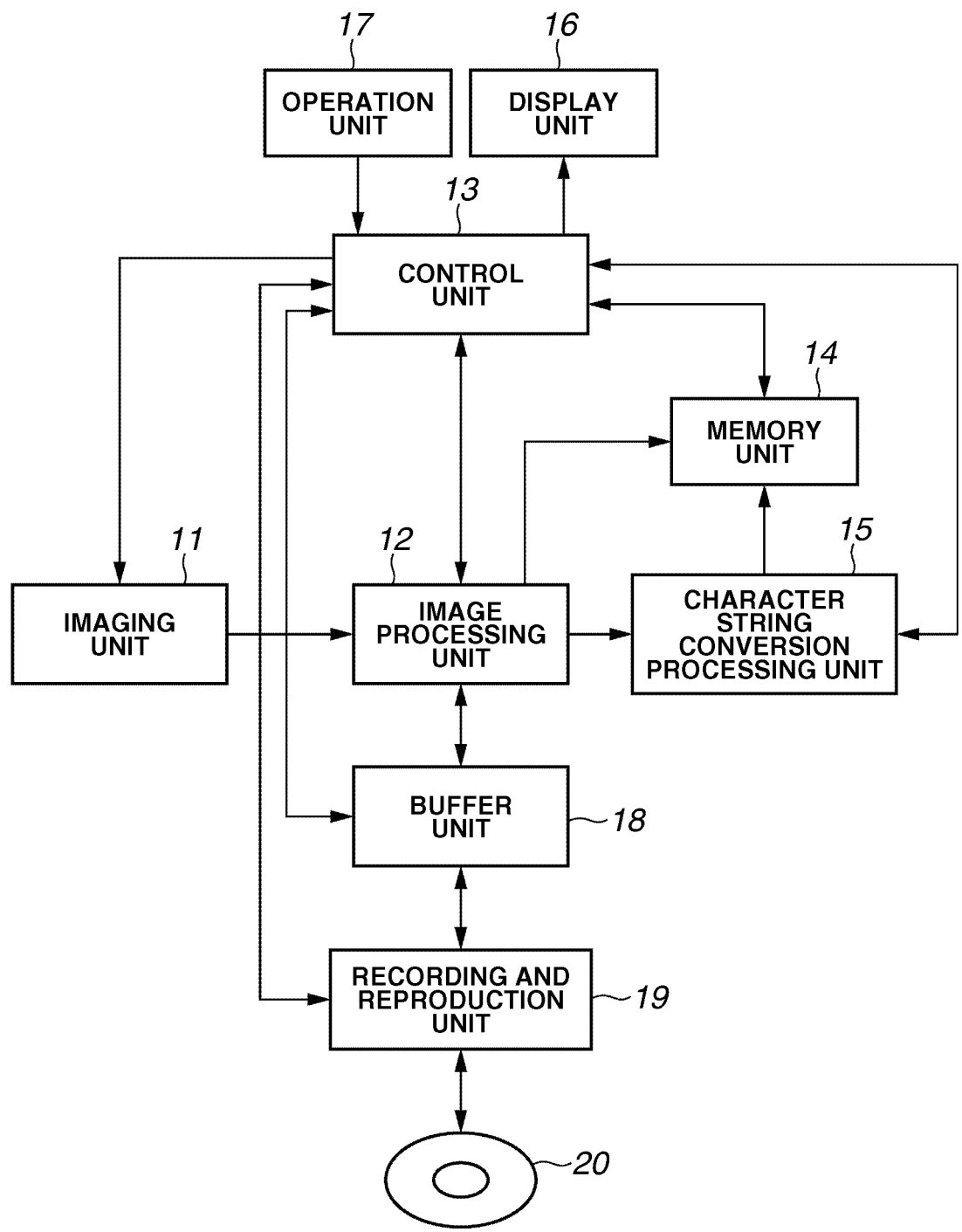
FIG. 1 illustrates an example of a configuration of a video camera according to a first exemplary embodiment of the present invention.

Now, a first exemplary embodiment of the present invention will be described below. FIG. 1 illustrates an example of a configuration of a video camera according to the first exemplary embodiment of the present invention.

The video camera according to the present exemplary embodiment includes an imaging unit 11, an image processing unit 12, a control unit 13, a memory unit 14, a character string conversion processing unit 15, a display unit 16, an operation unit 17, a buffer unit 18, and a recording and reproduction unit 19. The video camera records, on an optical disk 20, image data captured with the imaging unit 11 and audio data generated with audio circuits (not illustrated).

The imaging unit 11 includes a lens barrel having shooting lens units and a mechanical shutter unit and an image sensor disposed at the back of the lens barrel. An object image is formed on a light-receiving surface of the image sensor as visual information. The imaging unit 11 variably sets a shutter speed and an exposure value based on a control signal from the control unit 13 and outputs an image signal generated by the image sensor to the image processing unit 12.

The image processing unit 12 separates the image signal input from the image sensor into a luminance component and a color component and receives a control signal from the control unit 13. After correcting the luminance component and the color component, the image processing unit 12 outputs the thus corrected image signal to the memory unit 14.

The control unit 13 includes a central processing unit (CPU) (not illustrated), a program memory (not illustrated), and a work memory (not illustrated). The CPU loads a specific control program from the program memory and executes the program loaded on the work memory. Thus, the control unit 13 reads the image signal output from the image processing unit 12, controls the imaging unit 11, and outputs the image signal to the display unit 16.

Furthermore, the control unit 13 writes data on the memory unit 14 and controls the character string conversion processing unit 15 to control the operation of the video camera. Furthermore, the control unit 13 has a function as a data file generation unit, a parameter value setting unit, an evaluation value calculation unit, a file name setting unit, or an image signal searching unit.

The display unit 16 includes an approximately-3-inch liquid crystal display (LCD), which is provided as a viewfinder. The image signal converted into a format compliant with the format for a display by the display unit 16 and output from the control unit 13 is displayed on the LCD.

The memory unit 14 includes a recording medium that can non-volatilely store the image file generated as a predetermined data file and output from the image processing unit 12 and various setting data. As the recording medium, a magnetic tape, an HDD, a DVD, or a semiconductor memory can be used.

The memory unit 14 can be removable from the video camera. Furthermore, a plurality of memory units 14 can be provided in the video camera to record various setting data and image files on different recording media.

The operation unit 17 includes a trigger key, a zoom button, a menu operation button, and a recording/reproduction switch. The trigger key can be operated by a user to issue an instruction for starting or stopping shooting of a moving image. The zoom button can be operated by a user to issue an instruction for operating the lens units. The recording/reproduction switch can be operated by a user to issue an instruction for switching an operation mode of the video camera between a recording mode and a reproduction mode. Furthermore, the operation unit 17 includes a thumbnail button which can be operated by a user to issue an instruction for preferentially generating a thumbnail based on a character string captured by the imaging unit 11. An operation signal from the operation unit 17 is output to the control unit 13.

The character string conversion processing unit 15 is controlled by the control unit 13 to generate binary data based on the luminance component of the image signal from the imaging unit 11 using a predetermined threshold value. The binary data includes a value corresponding to a character portion and a value corresponding to a background portion. The character string conversion processing unit 15 collates the binary data with a character recognition pattern previously recorded on the program memory of the control unit 13 to extract a character string. The character string conversion processing unit 15 then outputs the extracted character string data to the control unit 13.

The buffer unit 18 stores stream data that has been multiplexed by the image processing unit 12. The image processing unit 12 multiplexes compressed and coded video data and audio data to generate stream data. Furthermore, the image processing unit 12 demultiplexes stream data to generate video data and audio data. The optical disk 20 is a recordable medium, such as a DVD-recordable (DVD-R) or a DVD-rewritable (DVD-RW). A video image or a still image is recorded on and reproduced from the optical disk 20.

An electric signal obtained by the imaging unit 11 at the time of recording is converted into digital data by the image processing unit 12. Furthermore, an audio signal captured by a microphone (not illustrated) is converted into digital data by an audio signal processing unit (not illustrated). The digitized video data and audio data are then sent to a data compression unit (not illustrated) to be compressed, and then the compressed data is subjected to multiplexing processing by the image processing unit 12. The compressed and multiplexed video data and audio data are then stored on the buffer unit 18.

The buffer unit 18 has a capacity large enough to store stream data of one unit of recording. When one recording unit of stream data is stored on the buffer unit 18, the stream data is written on the optical disk 20 via the recording and reproduction unit 19. Then, information about the stream data written on the optical disk 20 is written on the memory of the control unit 13.

At the time of reproduction, the recording and reproduction unit 19 reads the image data recorded on the optical disk 20. The image data is output to the image processing unit 12 via the buffer unit 18.

The recording and reproduction unit 19 according to the present exemplary embodiment includes a pickup for writing and reading data by irradiating a light beam on the optical disk 20. Furthermore, the recording and reproduction unit 19 includes a sensor that receives a reflection light beam from the optical disk 20. Moreover, the recording and reproduction unit 19 includes a mechanism such as a seek motor that moves the pickup in a direction of a radius of the optical disk 20 and a spindle motor that rotates the optical disk 20.

Now, an operation performed during shooting by the video camera according to the present exemplary embodiment will be described below. When the video camera is in the recording (shooting) mode, a user operates the operation unit 17 to activate the video camera and to display image data on the display unit 16 in real time, and switches the mode of the video camera to a preview mode. In this preview mode, the user verifies a composition. Then, the user operates the trigger key of the operation unit 17 to start shooting. In stopping the shooting operation, the user operates the trigger key of the operation unit 17 again. Thus, the shooting operation ends.

The image captured by the video camera is converted into image data by the image processing unit 12 of the video camera. A character string in the image data is recognized, during a shooting operation or after the shooting operation has ended, as a character string by the character string conversion processing unit 15. Then, the recognized character string is output as text data. The output text data of the character string is then recorded on the memory unit 14 as a pair with a parameter value, which is determined based on a characteristic of appearance of character information.

The moving image capture apparatus according to the present exemplary embodiment sets a parameter value to each character string extracted from the image data and selects a file name from among the extracted character strings. In this regard, now, an operation for setting a parameter value and an operation for selecting a file name will be described below.

First, the parameter value setting operation will be described. The present exemplary embodiment uses, as a parameter, at least one of detection timing, a file name button user operation timing, a detection time length, an extraction frequency, a character string size, a character string position on a screen, and a character string recognition accuracy.

In the present exemplary embodiment, the "detection timing" refers to a position of the recognized character string within the file on the time axis. The "file name button user operation timing" refers to a timing at which a character string that the user desires to set as a file name appears during shooting a moving image. At this timing, the user can perform desired weighting on the character string by operating a file name button displayed on the operation unit 17. The file name button pressed by the user here can be double-functional with a photo button for shooting a photograph.

The "detection time length" is a parameter indicating that a character string has been consecutively detected. The "extraction frequency" is a parameter indicating a frequency of detection of a character string in a file.

The "character string size" is a parameter indicating a size of a first character of a character string. The size of the character string detected during shooting a moving image is the size of the character string whose image is formed on the light-receiving surface of the image sensor. Accordingly, the character string size varies in real time on the time axis due to moving of the lens units performed according to a user operation of the zoom button or moving of the object. In this regard, the parameter indicating the character string size according to the present exemplary embodiment is defined as a character string size calculated by averaging the character string sizes within the detection time.

The "character string position on a screen" is a parameter indicating a position of a character string on a screen. The character string position detected during the moving image shooting is the position of the character string whose image is formed on the light-receiving surface of the image sensor. Accordingly, just as in the case of the character string size, the character string position varies in real time on the time axis due to moving of the lens units performed according to a user operation of the zoom button or moving of the object.

In this regard, the parameter indicating a character string position according to the present exemplary embodiment is defined in a manner such that a region on the display screen is divided into a plurality of regions, and then each divided region is defined by determining in which region the center of gravity of a character string region has been detected for a longest period of time.

The "character string recognition accuracy" is a parameter indicating an accuracy of recognizing a character string. The recognition accuracy is determined according to whether a background color is even and how large a difference between a luminance level of a background region and that of a character string region is. Accordingly, the recognition accuracy varies in real time on the time axis due to moving of the lens units performed according to a user operation of the zoom button or moving of the object. The character string recognition accuracy according to the present exemplary embodiment is defined with a highest accuracy within the detection time length.

Now, the above parameter values will be described. The parameter value indicating the detection timing is indicated as an elapsed time starting with a value "0", which is set for the time of starting of a file. The parameter value indicating the detection time length is indicated by the number of seconds of consecutive shooting.

The parameter value indicating the file name button user operation timing is indicated by a value indicating whether the user has pressed the file name button. The parameter value indicating the extraction frequency is indicated by a number of times of detection of the same text data within a file.

The parameter value indicating the character string size is a size covered by a rectangle of each predetermined pixel size, in which a first character of an average-sized character string can be appropriately framed. The parameter value indicating the character string size is indicated with a value previously assigned to the predetermined rectangle.

Figure 4:
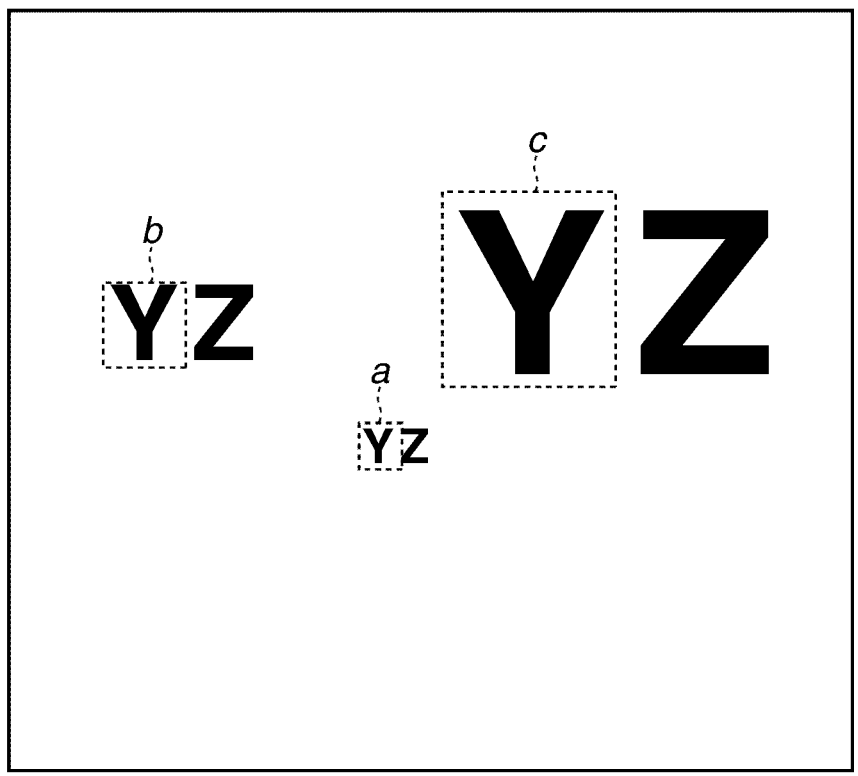
FIG. 4 illustrates an example of a parameter value indicating a predetermined character string size according to the first exemplary embodiment of the present invention.

For example, if the size of a character string is smaller than the size of a rectangle "a" (FIG. 4), then the parameter value for the character string size is set to "0". If the size of a character string is larger than the size of the rectangle "a" but smaller than the size of a rectangle "b" (FIG. 4), then the parameter value for the character string size is set to "1". If the size of a character string is larger than the size of the rectangle "b" but smaller than the size of a rectangle "c" (FIG. 4), then the parameter value for the character string size is set to "2". If the size of a character string is larger than the size of the rectangle "c", then the parameter value for the character string size is set to "5".

Figure 3:
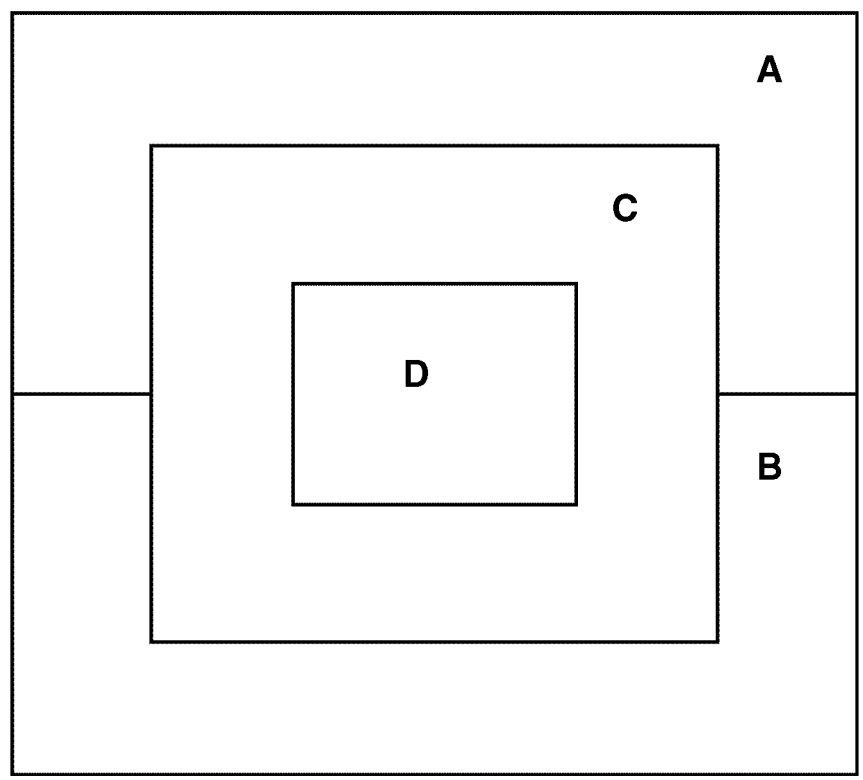
FIG. 3 illustrates an example of a parameter value indicating a position of a character string on a screen according to the first exemplary embodiment of the present invention.

The parameter value for the position of a character string on a screen is set to "0", "1", "2", or "5", according to in which region (each of regions A, B, C, and D of the display screen (FIG. 3)) the position of the character string at which the character string has been detected for a longest period of time exists. The parameter value indicating the recognition accuracy is indicated with a highest recognition accuracy within the detection time.

Figure 2A:
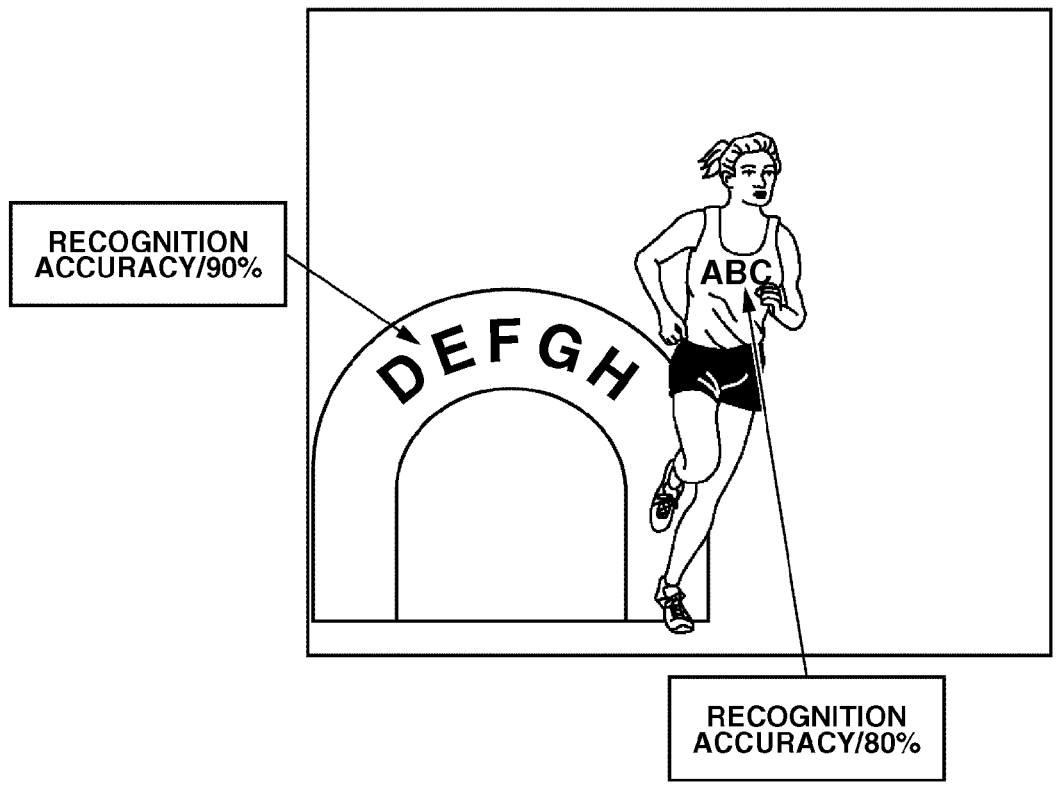
FIGS. 2A through 2C each illustrate an example of one scene of captured image data displayed on a display unit according to the first exemplary embodiment of the present invention.

FIG. 2A illustrates an example of one scene of captured image data displayed on the display unit 16 according to the present exemplary embodiment. The scene illustrated in FIG. 2A is a scene captured five seconds after the start of shooting. The file including image data having the scene in FIG. 2A includes image data that has been consecutively shot for sixty minutes.

Here, it is assumed that the size of the character string has been averaged within the detection time, for easier understanding. Furthermore, the character string position indicates the position at which the character string has been detected for a longest period of time. Moreover, the recognition accuracy indicates a highest accuracy within the detection time. In the scene in FIG. 2A, two character strings, namely, "ABC" and "DEFGH" have been recognized. The parameter values for the recognized character strings are as follows.

That is, with respect to the parameter values for the character string "ABC", the detection timing is set to "00:00:05", the detection time length is set to "5", and the character string detection frequency is set to "1". Furthermore, the character string size is set to "1", the position of a character string on a screen is set to "5", a pressure level on the thumbnail button is set to "0", and the recognition accuracy is set to 80%.

With respect to the parameter values for the character string "DEFGH", the detection timing is set to "00:00:01", the detection time length is set to "20", and the character string detection frequency is set to "1". Furthermore, the character string size is set to "2", the position of a character string on a screen is set to "2", a pressure level on the thumbnail button is set to "0", and the recognition accuracy is set to 90%.

Now, a method for selecting a file name from among a plurality of character strings using the text data of the detected character string and the parameter values recorded as a pair with the character string according to the present exemplary embodiment will be described below with reference to the flow chart of FIG. 5.

Figure 5:
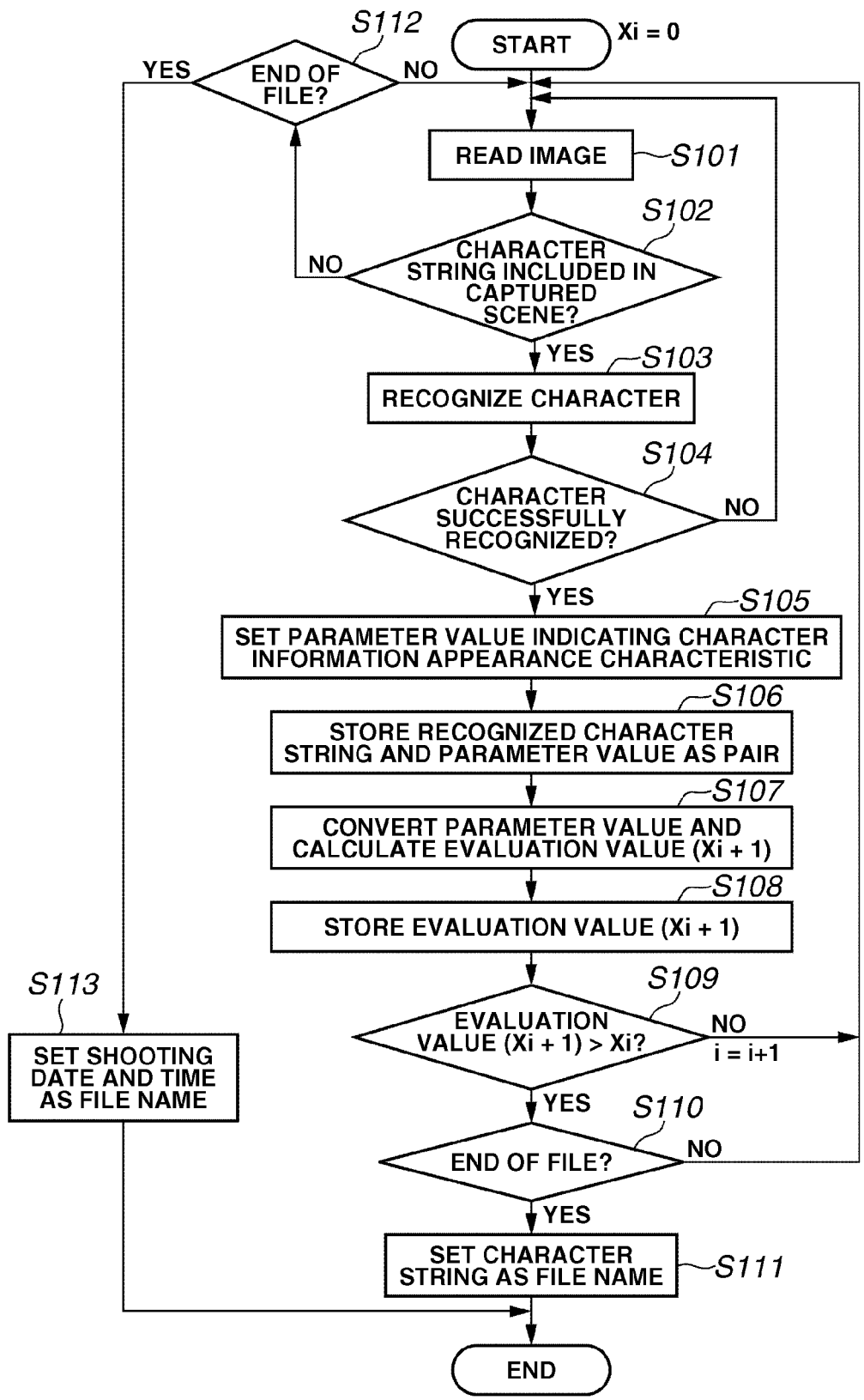
FIG. 5 is a flow chart illustrating an example of processing from capturing image data to selecting a file name according to the first exemplary embodiment of the present invention.

FIG. 5 is a flow chart illustrating an example of processing from capturing image data to selecting a file name according to the present exemplary embodiment.

Referring to FIG. 5, after the processing has started, in step S101, the control unit 13 reads images in order from the first image of the file.

In step S102, the control unit 13 determines whether a character string is included in the captured scene.

If it is determined in step S102 that the captured scene includes no character string (NO in step S102), then the control unit 13 advances to step S112. In step S112, the control unit 13 determines whether the current scene is an end of the file.

If it is determined in step S112 that the current scene is not an end of the file (NO in step S112), then the control unit 13 returns to step S101 and serially reads images until an image having a character string is found. On the other hand, if it is determined in step S112 that the current scene is an end of the file (YES in step S112), then the control unit 13 advances to step S113. In step S113, the control unit 13 sets the shooting date and time as a file name, and then ends the processing.

On the other hand, if it is determined in step S102 that a captured scene includes a character string (YES in step S102), then the control unit 13 advances to step S103. In step S103, the character string conversion processing unit 15, under control of the control unit 13, performs a character recognition.

In step S104, the control unit 13 determines whether the character recognition in step S103 has been successfully performed.

If it is determined in step S104 that the character recognition in step S103 has been successfully performed (YES in step S104), then the control unit 13 advances to step S105. On the other hand, if it is determined in step S104 that the character recognition in step S103 has not been successfully performed (NO in step S104), then the control unit 13 returns to step S101 to repeat the above-described processing.

In step S105, the control unit 13 sets a parameter value indicating a characteristic of character information appearance. In step S106, the control unit 13 stores the text data of the character string and the parameter value for the character information appearance as a pair on the memory unit 14.

In step S107, the control unit 13 converts the parameter value in the following manner and calculates an evaluation value using the converted parameter value. First, with respect to the elapsed time from the start of shooting, which is the parameter value for the detection timing, the control unit 13 converts the elapsed time of ten seconds or earlier from the start of shooting into five points and the elapsed time of thirty seconds or earlier and later than ten seconds from the start of shooting into two points, as weighting indicating closeness to the start of the file. Furthermore, the control unit 13 converts the elapsed time of one minute or earlier and later than thirty seconds from the start of shooting into one point and the elapsed time later than one minute from the start of shooting into zero point.

On the other hand, the control unit 13 converts the elapsed time of ten seconds or less to the end of shooting into five points, the elapsed time of thirty seconds or less and more than ten seconds to the end of shooting into two points, the elapsed time of one minute or less and more than thirty seconds to the end of shooting into one point, and the elapsed time more than one minute to the end of shooting into zero point, as weighting indicating closeness to the end of the file. The parameter value for the detection time length is converted as a numerical value calculated by multiplying the number of seconds (parameter value) by one-tenth.

With respect to the parameter value for the file name button operation timing, the control unit 13 converts the detection result of presence of the user file name button operation into one point and the detection result of absence of the user file name button operation into zero point. With respect to the parameter value for the extraction frequency, the control unit 13 converts the number of extractions into points.

With respect to the parameter value for the character string size, the control unit 13 converts the numerical value corresponding to the size of various rectangles into points. With respect to the parameter value for the character string position on a screen, the control unit 13 converts the numerical value into points. With respect to the parameter value for the character string recognition accuracy, the control unit 13 uses the ratio of character recognition accuracy as it is.

An evaluation value H can be calculated by the following expression:

$$H = \text{the value for the number of times of detection} \times \{ \text{(the file name button user operation value} + 1) \times \text{the character string recognition accuracy value} \times \text{(the value for the detection timing from the start of the file} + \text{the detection time length value} + \text{the value for the detection timing to the end of the file} + \text{the character string size value} + \text{the value for the character string position on a screen)} \}.$$

In step S108, the control unit 13 stores the thus-calculated evaluation value on the memory unit 14.

In step S109, the control unit 13 compares the stored evaluation values with each other to select an evaluation value X, which is the largest value in the file. Here, an initial evaluation value X is defined as "0". If it is determined in step S109 that an expression "$X_{i+1} > X_i$" is not satisfied (NO in step S109), then the control unit 13 increments "i" by one and returns to step S101.

After having selected the largest evaluation value X, the control unit 13 advances to step S110. In step S110, the control unit 13 determines whether a comparison has been performed on all of the character strings in the file (whether the current image is the end of the file).

If it is determined in step S110 that the current image is not the end of the file (NO in step S110), then the control unit 13 returns to step S101 to repeat the above-described processing. On the other hand, if it is determined in step S110 that the current image is the end of the file (YES in step S110), then the control unit 13 advances to step S111.

In step S111, the control unit 13 sets the character string having the largest evaluation value $X_i$ as a file name for the moving image file. For example, in the case where only two character strings, namely, "ABC" and "DEFGH", which have been extracted under the conditions in FIG. 2A, exist in the file, the evaluation value for the character string "ABC" is 9.2 points and that for the character string "DEFGH" is 11.7 points. Therefore, the character string "DEFGH" is determined to have the larger evaluation value of the two. Accordingly, the control unit 13 determines the file name of the file (data file name) as "DEFGH".

The set file name is displayed on the display unit 16. Here, if the automatically-set file name is different from the file name that the user desires, the user can select and designate, as the file name, a character string in another image selected from among images having character strings displayed on the display unit 16 as a list in descending order of the evaluation value.

By adding and using the parameter related to the time axis as a parameter defined by a characteristic of character information appearance, the control unit 13 can select one character string from among a plurality of character strings appearing one after another during shooting a moving image and set the selected character string as a file name.

In the present exemplary embodiment, the following expression is used for calculating the evaluation value H. That is, if the following expression for calculating the evaluation value H is used, the user can select an image having a character string that the user has desired to use as a file name, and thus the user can more correctly set the file name.

$H = h \times$ the value for the number of times of detection $\times \{ (n \times$ the value for the file name button user operation$+1) \times l \times$ the character recognition accuracy value$\times (x \times$ the value for the timing from the start of the file$+y \times$ the value for the timing to the end of file$+q \times$ the detection time length value$+p \times$ the character string size value$+z \times$ the value for the character string position on a screen)$\}$, where "h" and "n" denote a coefficient for a priority degree of extraction frequency, "l" denotes a coefficient for a priority degree of the character recognition accuracy, "x" denote a coefficient for a priority degree of the timing from the start of the file, "y" denote a coefficient for a priority degree of the timing to the end of the file, "q" denote a coefficient for a priority degree of the detection time length, "p" denote a coefficient for a priority degree of the character string size, "z" denote a coefficient for a priority degree of the position of the character string on the screen, and the above-described coefficients "l", "x", "y", "q", "p", and "z" each denote a value for the weight of the character string indicating an appropriateness as a file name.

That is, the user can operate the menu operation button of the operation unit 17 to selectively change the degree of priority of the above-described parameters and to change the value indicating the weight of the character string indicating an appropriateness as a file name.

As described above, by changing the value indicating an appropriateness of the character string as a file name, the user can more accurately select the character string that the user has desired to use as a file name.

Here, it is useful to record the value for the weight of a character string indicating an appropriateness as a file name on the same recording medium as the one storing the data file including the captured image signal (in the present exemplary embodiment, the optical disk 20), thus maintaining a consistency of the file names on one recording medium. Furthermore, the value for the weight of a character string indicating an appropriateness as a file name can be recorded on a recording unit different from the one storing the data file including the captured image signal (for example, a non-volatile memory unit in the video camera (in the present exemplary embodiment, the memory unit 14)). With such a configuration, the consistency of the file names can be maintained in the case of shooting a moving image with the same video camera.

In the case of searching for a character string that has not been used as a file name, it is useful to make a list of character strings and display the character string list on the display unit 16 in order of the extraction frequency or the character string size. With this configuration, the user can more easily search for a desired scene from among a large number of scenes including character strings. For example, it is useful to display the character string list on the display unit 16 in order of the evaluation value. With this configuration, the user can more easily search for a scene including an image having a desired character string from among many character strings included in a large-sized file.

Figure 6:
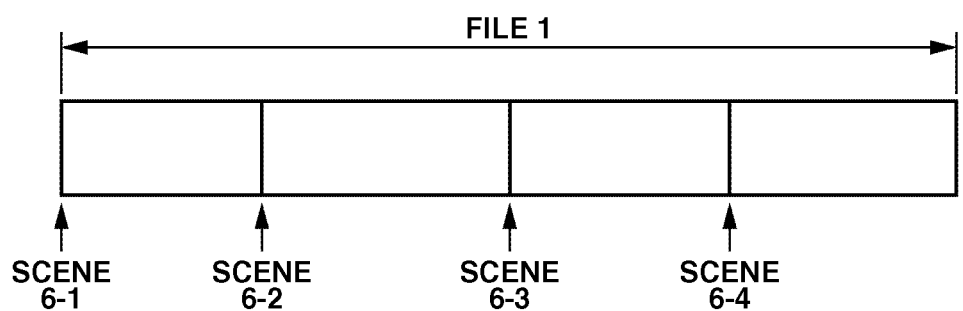
FIG. 6 illustrates an example of one moving image file according to the first exemplary embodiment of the present invention.
Figure 7:
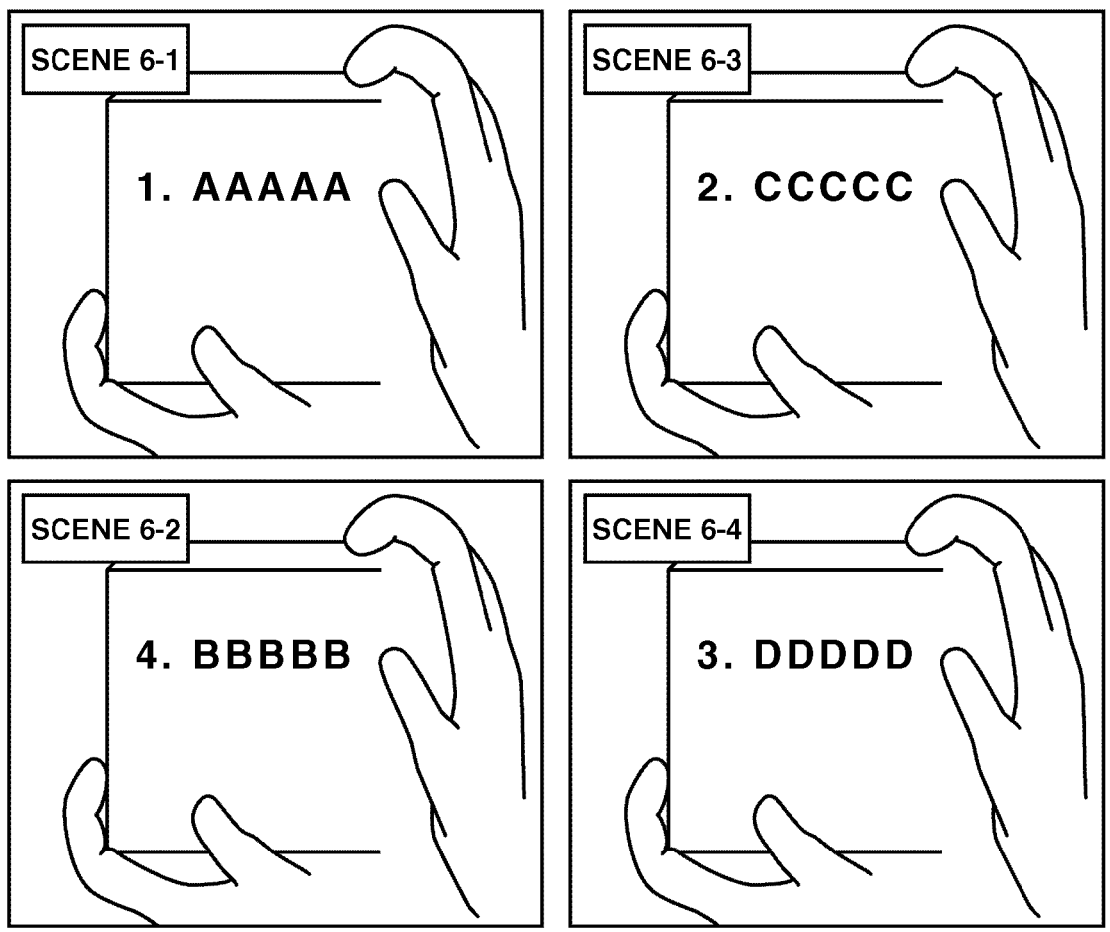
FIG. 7 illustrates an example of a screen of the display unit displaying an image having a character string in each of scenes 6-1 through 6-4 according to the first exemplary embodiment of the present invention.

FIG. 6 illustrates an example of a file 1, which is a moving image file, according to the present exemplary embodiment. Referring to FIG. 6, portions "scene 6-1", "scene 6-2", "scene 6-3", and "scene 6-4" of the file 1 each include a corresponding captured scene (scenes 6-1, 6-2, 6-3, or 6-4 (FIG. 7)). A character string having the largest evaluation value in the moving image file 1 is a character string "1. AAAAA" in the scene 6-1. Thus, the file name for the file 1 is determined to be "1. AAAAA".

Figure 8:
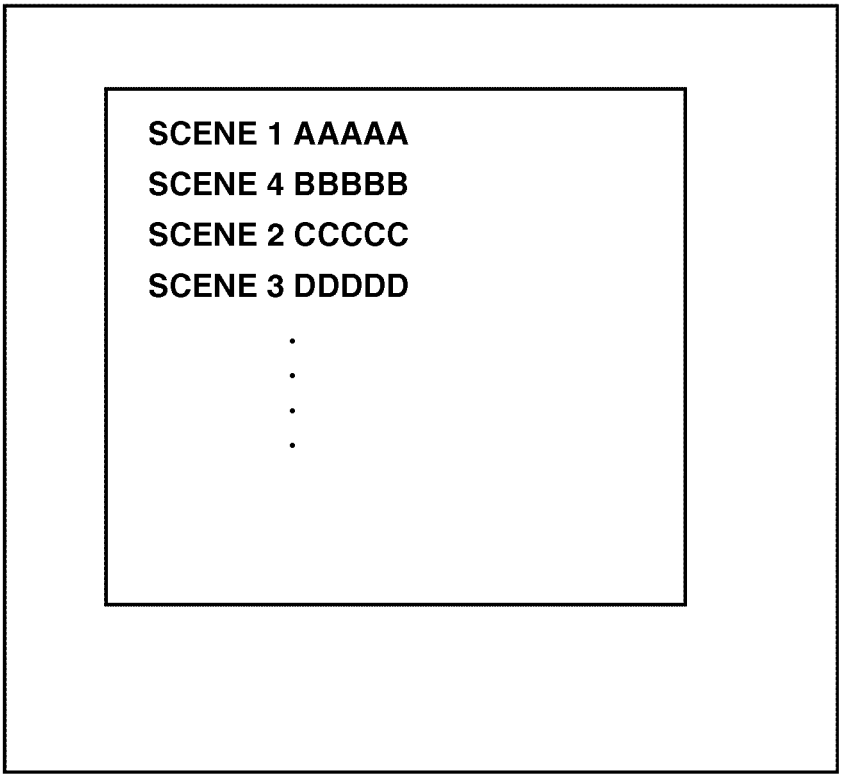
FIG. 8 illustrates an example of a screen of the display unit displaying a list of extracted character strings, which is displayed when a user searches captured images in one file, according to the first exemplary embodiment of the present invention.

The user has shot scenes including a character string (the scenes 6-1, 6-2, 6-3, or 6-4 (FIG. 7)). Accordingly, at the time of searching the moving image file, the character strings are listed and displayed on the display unit 16 (FIG. 8). By displaying a list of character strings that have not been used as a file name at the time of searching a moving image file, the user can easily search for a scene including a character string that the user has desired to use as a file name.

Meanwhile, in shooting a moving image, in some cases, a user may shoot a series of scenes from the start of shooting to its end as one file, divide the file after the shooting has ended, and perform an editing operation such as rearranging the order of the divided files.

In this regard, now, a method for selecting a file name performed when one file is divided into a plurality of files.

Figure 9:
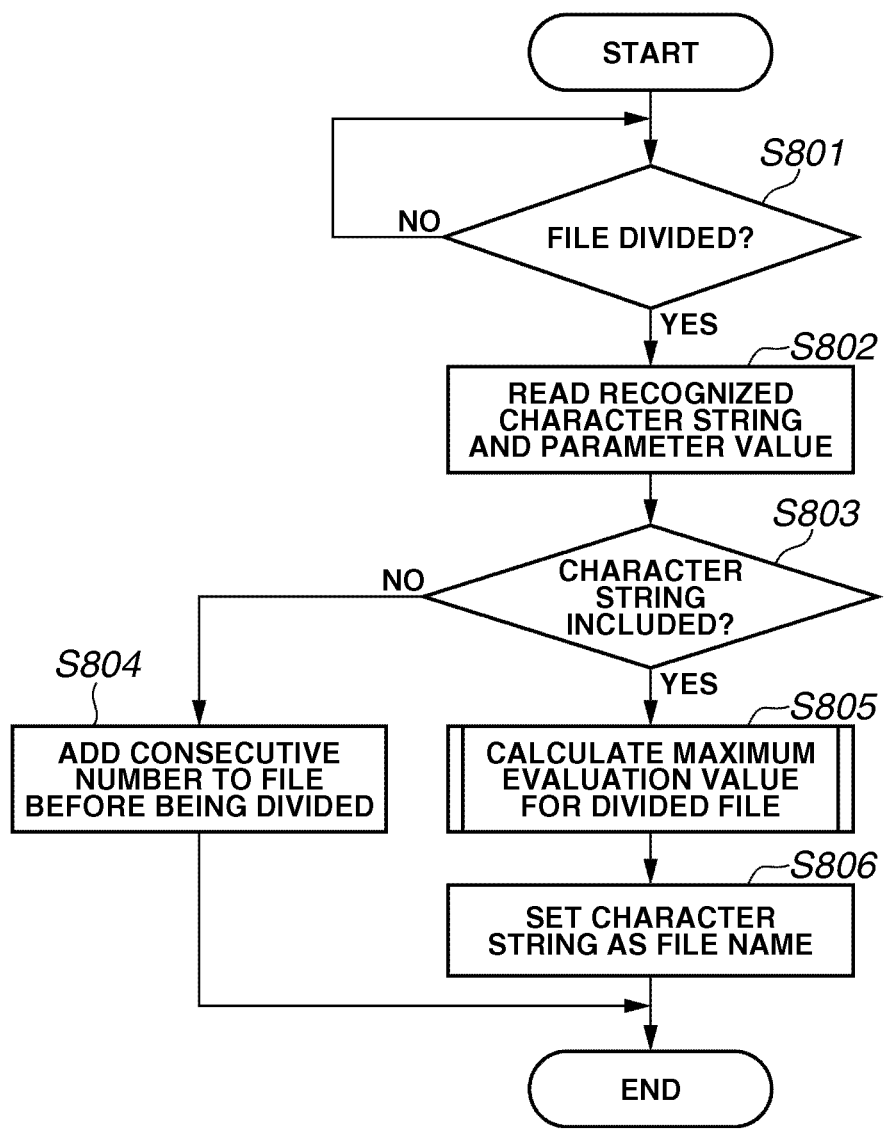
FIG. 9 is a flow chart illustrating an example of processing for selecting a file name performed when the file is divided into a plurality of files, according to the first exemplary embodiment of the present invention.
Figure 10:
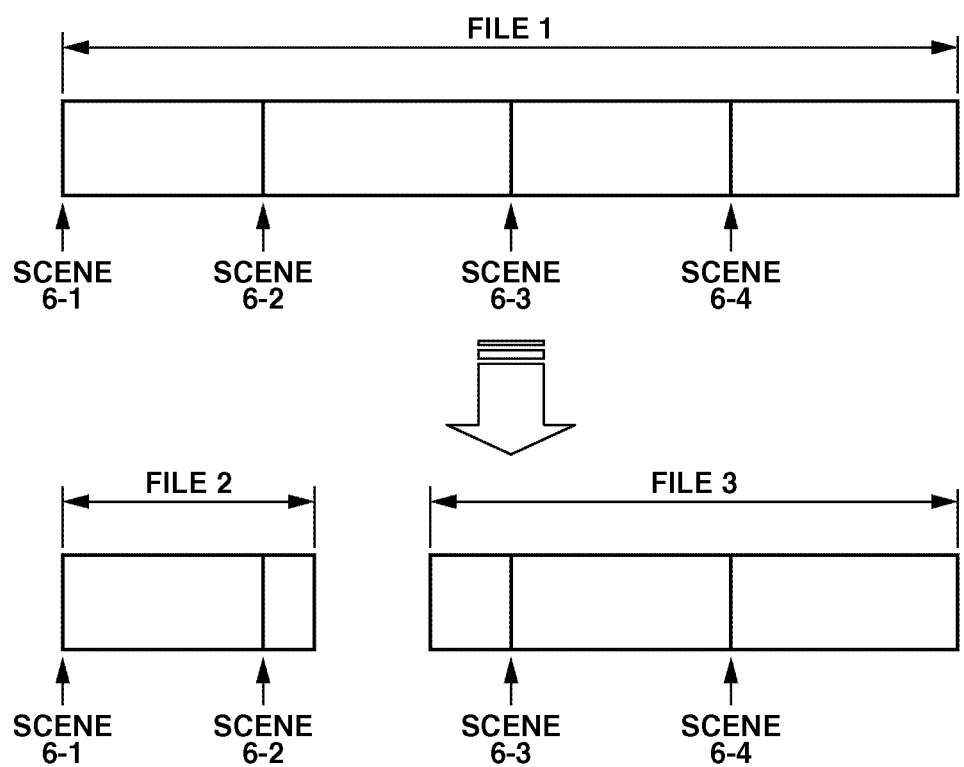
FIG. 10 illustrates an example of divided moving image files according to the first exemplary embodiment of the present invention.

FIG. 9 is a flow chart illustrating an example of processing for selecting a file name according to the present exemplary embodiment. The flow chart of FIG. 9 illustrates processing for selecting a file name performed when one file 1 (FIG. 10) is divided into a file 2 (FIG. 10) and a file 3 (FIG. 10).

When the processing starts, in step S801, the control unit 13 determines whether the file 1 has been divided and waits until it is determined that the file 1 has been divided. If it is determined in step S801 that the file 1 has been divided into the file 2 and the file 3 (YES in step S801), then the control unit 13 advances to step S802. In step S802, the control unit 13 reads a character string and a parameter value included in the file 3 that has been obtained as a result of the division. Here, the file name of the file 2 is set the same as the file name of the file 1.

In step S803, the control unit 13 determines whether a character string exists in the file 3 that has been obtained as a result of the division. If it is determined in step S803 that no character string exists in the file 3 (NO in step S803), then the control unit 13 advances to step S804. In step S804, the control unit 13 performs processing for adding a consecutive number to the file name of the file before being divided, and then ends the processing.

On the other hand, if it is determined in step S803 that a character string exists in the file 3 that has been obtained as a result of the division (YES in step S803), then the control unit 13 advances to step S805. In step S805, the control unit 13 compares the evaluation values with each other with respect to the file 3 using the above-described method. In step S806, the control unit 13 sets a character string having the largest evaluation value within the file 3 as a file name of the file 3.

The file name of the file 3, which is automatically set as described above, is displayed on the display unit 16. If the automatically-set file name is different from the file name that the user has desired, the user can select a different desired character string from among the character strings listed and displayed on the display unit 16 in order of the evaluation value and set the desired character string as a file name of the file 3.

For example, in the case where the moving image file 1 (FIG. 6) is divided into the file 2 (FIG. 10) and the file 3 (FIG. 10), the control unit 13 performs the calculation for the evaluation value with respect to the file 3 that has been obtained as a result of the division. Here, if a character string having the largest evaluation value within the file 3 is a character string "4. BBBBB", which has been extracted from the scene in FIG. 7, the control unit 13 sets the character string "4. BBBBB" as a file name of the file 3. Here, the file name of the file 2 can be newly set by also performing the calculation for the evaluation value with respect to the file 2.

As described above, according to the present exemplary embodiment, in the case where a user has shot a series of scenes from the start of shooting to its end as one file and divides the file into a plurality of files after the shooting operation has ended, a new file name acquired as a result of the character recognition can be added to the files obtained as a result of the division. Accordingly, the user can easily recognize content of a file without taking the trouble of closely verifying content of the file, even in the case where the order of the files that have been obtained as a result of the division is rearranged.

Second Exemplary Embodiment

Now, a second exemplary embodiment of the present invention will be described. In the present exemplary embodiment, the video camera has a similar configuration as that illustrated in FIG. 1 in the first exemplary embodiment. Accordingly, the configuration of the video camera according to the present exemplary embodiment will not be repeated.

The video camera according to the present exemplary embodiment sets a parameter value to a character string that has been extracted from image data generated during shooting and performs weighting based on a characteristic of appearance of the extracted character string, to select an appropriate thumbnail. In the present exemplary embodiment, the control unit 13, which functions as a parameter value setting unit, sets the parameter value using at least one of parameters including the detection timing, the detection time length, the detection frequency, the character string size, the position of the character string on a screen, and the character string recognition accuracy.

Now, operation for setting a parameter value and processing for selecting an image that is used to generate a thumbnail will be described. First, the operation for setting a parameter value performed by the moving image capture apparatus according to the present exemplary embodiment will be described. The present exemplary embodiment uses, as parameters, the detection timing, the thumbnail button user operation timing, the detection time length, the extraction frequency, the character string size, the character string position on a screen, and the character string recognition accuracy.

In the present exemplary embodiment, the "detection timing" refers to a position of the recognized character string within the file on the time axis. The "thumbnail button user operation timing" refers to a timing at which a character string that the user desires to set as a thumbnail appears during shooting a moving image. At this timing, the user can perform desired weighting on the character string by operating a thumbnail button displayed on the operation unit 17. Thus, the user can change a definition for calculating an evaluation value from the parameter value.

Here, the operation unit 17 functions as an operation unit for allowing the user to change the definition for calculating the evaluation value. Thus, the desire of the user can be appropriately reflected in calculating the evaluation value from the parameter value with the control unit 13, which functions as an evaluation value calculation unit.

The thumbnail button pressed by the user here can be double-functional with a photo button for shooting a photograph. The "detection time length" is a parameter indicating that a character string has been consecutively detected. The "extraction frequency" is a parameter indicating a frequency of detection of a character string in a file.

The "character string size" is a parameter indicating a size of a first character of a character string. The size of the character string detected during shooting a moving image is the size of the character string whose image is formed on the light-receiving surface of the image sensor. Accordingly, the character string size varies every instant on the time axis due to moving of the lens units performed according to a user operation of the zoom button or moving of the object.

The "character string position on a screen" is a parameter indicating a position of a character string on a screen. The character string position detected during shooting a moving image is the position of the character string whose image is formed on the light-receiving surface of the image sensor. Accordingly, just as in the case of the character string size, the character string position varies every instant on the time axis due to moving of the lens units performed according to a user operation of the zoom button or moving of the object.

The "character string recognition accuracy" is a parameter indicating an accuracy of recognizing a character string. The recognition accuracy is determined according to whether a background color is even and how large a difference between a luminance level of a background region and that of a character string region is. Accordingly, the recognition accuracy varies in real time on the time axis due to moving of the lens units performed according to a user operation of the zoom button or moving of the object. The character string recognition accuracy, according to the present exemplary embodiment, is defined as a highest accuracy within the detection time.

Now, the above parameter values will be described. The parameter value indicating the detection timing is indicated as an elapsed time starting from a value "0", which is set for the time of starting of a file. The parameter value indicating the detection timing indicates a degree of relationship with an image that is a base of a thumbnail.

The parameter value indicating the detection time length is indicated by the number of seconds of consecutive shooting. The parameter value indicating the thumbnail button user operation timing is indicated by a value indicating whether the user has pressed the thumbnail button. The parameter value indicating the extraction frequency is indicated by a number of times of detection of the same text data in a file.

The parameter value indicating the character string size is a size covered by a rectangle of each predetermined pixel size, in which a first character of an average-sized character string can be appropriately framed. The parameter value indicating the character string size is indicated with a value previously assigned to the predetermined rectangle. For example, if the size of the rectangle is smaller than a size of the rectangle "a" (FIG. 4), then the parameter value for the character string size is set to "0". If the size of the rectangle is larger than the size of the rectangle "a" but smaller than a size of the rectangle "b" (FIG. 4), then the parameter value for the character string size is set to "1". If the size of the rectangle is larger than the size of the rectangle "b" but smaller than a size of the rectangle "c" (FIG. 4), then the parameter value for the character string size is set to "2". If the size of the rectangle is smaller than the size of the rectangle "c", then the parameter value for the character string size is set to "5".

The parameter value for the position of a character string on a screen is set to "0", "1", "2", or "5", according to in which region (each of the regions A, B, C, and D of the display screen (FIG. 3)) the position of the character string at which the character string has been detected for a longest period of time exists. The parameter value indicating the recognition accuracy is indicted by a ratio (%) of the recognition accuracy.

Figure 2B:
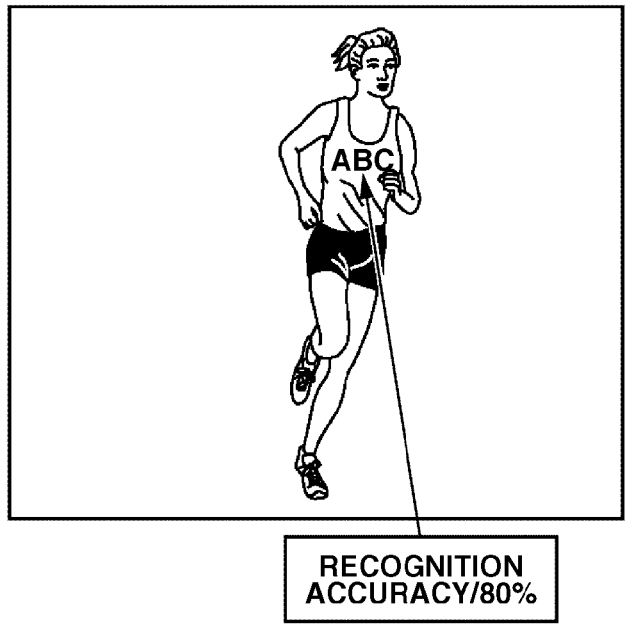
Figure 2C:
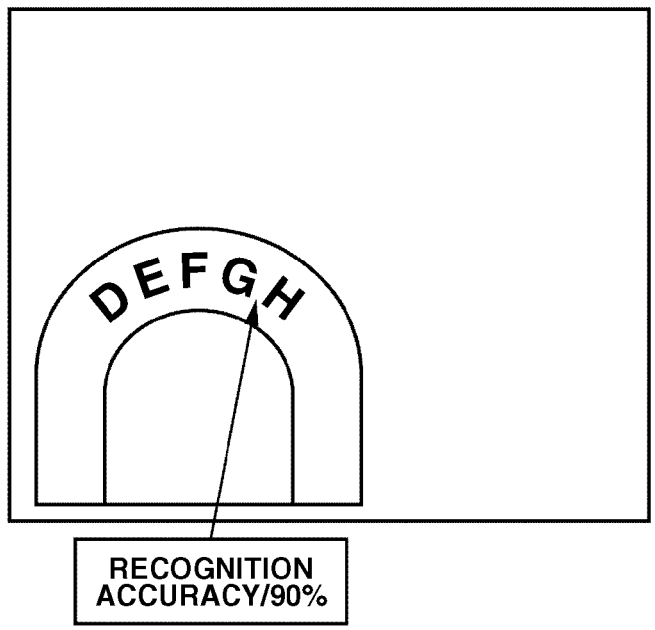

FIGS. 2B and 2C each illustrate an example of one scene of a data file having a character string and displayed on the display unit 16 according to the present exemplary embodiment. Within the data file, only two scenes of the scenes illustrated in FIGS. 2B and 2C include a character string. The scene illustrated in FIG. 2B is a scene captured five seconds after the start of shooting. The scene illustrated in FIG. 2C is a scene captured fifty minutes after the start of shooting. The file including image data having the scene in FIG. 2B or FIG. 2C includes image data that has been consecutively shot for sixty minutes.

A character string "ABC" is recognized from the scene in FIG. 2B. A character string "DEFGH" is recognized from the scene in FIG. 2C. The parameter values for each character string recognized from the scenes of FIG. 2B and FIG. 2C are as follows.

That is, with respect to the parameter value for the character string "ABC" (FIG. 2B), the detection timing is set to "00:00:05", the detection time length is set to "5", and the character string detection frequency is set to "1". Furthermore, the character string size is set to "1", the position of s character string on a screen is set to "5", a pressure level on the thumbnail button is set to "0", and the recognition accuracy is set to 80%.

With respect to the parameter value for the character string "DEFGH" (FIG. 2C), the detection timing is set to "00:00:55", the detection time length is set to "20", and the character string detection frequency is set to "1". Furthermore, the character string size is set to "2", the position of a character string on a screen is set to "2", a pressure level on the thumbnail button is set to "0", and the recognition accuracy is set to 90%.

Now, a method for selecting an image that is to be used for generating a thumbnail (thumbnail source image) performed using the text data of the detected character string and the parameter value recorded as a pair on the memory unit 14 according to the present exemplary embodiment will be described below with reference to the flow chart of FIG. 11.

Figure 11:
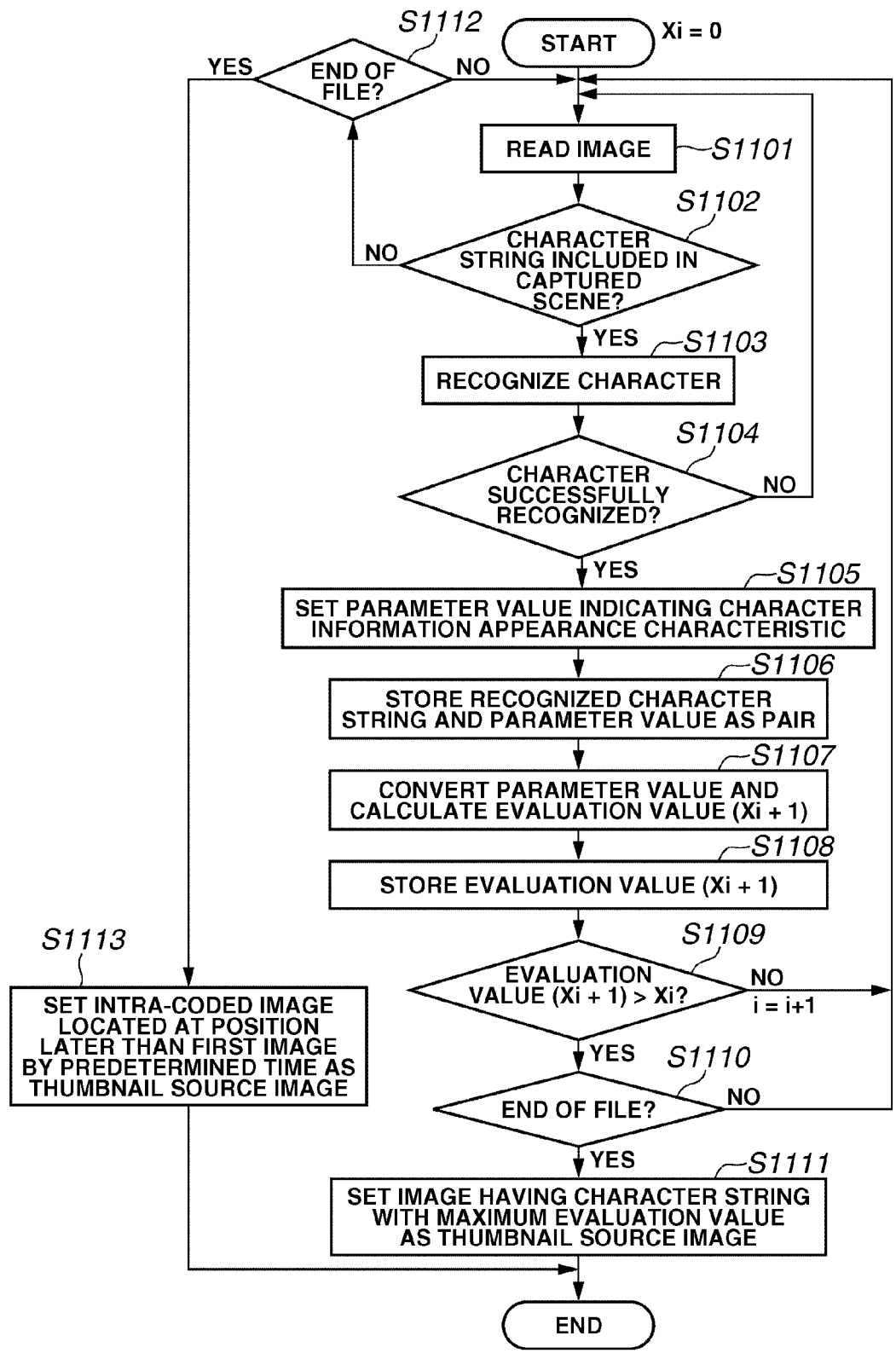
FIG. 11 is a flow chart illustrating an example of processing from capturing image data to selecting a thumbnail according to a second exemplary embodiment of the present invention.

FIG. 11 is a flow chart illustrating an example of processing from capturing image data to selecting a thumbnail according to the present exemplary embodiment.

Referring to FIG. 11, after the processing has started, in step S1101, the control unit 13 reads images in order from the first image of the file. In step S1102, the control unit 13 determines whether a character string is included in the captured scene.

If it is determined in step S1102 that the captured scene includes no character string (NO in step S1102), then the control unit 13 advances to step S1112. In step S1112, the control unit 13 determines whether the current scene is an end of the file. If it is determined in step S1112 that the current scene is not an end of the file (NO in step S1112), then the control unit 13 returns to step S1101 and serially reads images until an image having a character string is found. On the other hand, if it is determined in step S1112 that the current scene is an end of the file (YES in step S1112), then the control unit 13 advances to step S1113. In step S1113, the control unit 13 sets an intraframe-coded image positioned at a position later than the first image by a predetermined time length as the thumbnail source image, and then ends the processing.

On the other hand, if it is determined in step S1102 that a captured scene includes a character string (YES in step S1102), then the control unit 13 advances to step S1103. In step S1103, the character string conversion processing unit 15, under control of the control unit 13, performs a character recognition. In step S1104, the control unit 13 determines whether the character recognition in step S1103 has been successfully performed and evaluates the character recognition accuracy.

If it is determined in step S1104 that the character recognition in step S1103 has not been successfully performed (NO in step S1104), then the control unit 13 returns to step S1101 to repeat the above-described processing. On the other hand, if it is determined in step S1104 that the character recognition in step S1103 has been successfully performed (YES in step S1104), then the control unit 13 advances to step S1105. In step S1105, the control unit 13, which functions as a parameter value setting unit, sets the parameter value indicating a characteristic of appearance of the extracted character string. In step S1106, the control unit 13 stores text data of the character string and the parameter value for the character information appearance as a pair on the memory unit 14.

In step S1107, the control unit 13 converts the parameter value in the following manner and calculates an evaluation value using the converted parameter value. First, with respect to the elapsed time from the start of shooting, which is the parameter value for the detection timing, the control unit 13 converts the elapsed time of ten seconds or earlier from the start of shooting into five points and the elapsed time of thirty seconds or earlier and later than ten seconds from the start of shooting into two points, as weighting indicating closeness to the start of the file. Furthermore, the control unit 13 converts the elapsed time of one minute or earlier and later than thirty seconds from the start of shooting into one point and the elapsed time later than one minute from the start of shooting into zero point.

On the other hand, the control unit 13 converts the elapsed time of ten seconds or less to the end of shooting into five points, the elapsed time of thirty seconds or less and more than ten seconds to the end of shooting into two points, the elapsed time of one minute or less and more than thirty seconds to the end of shooting into one point, and the elapsed time more than one minute to the end of shooting into zero point, as weighting indicating closeness to the end of the file. The parameter value for the detection time length is converted as a numerical value calculated by multiplying the number of seconds (parameter value) with one-tenth.

With respect to the parameter value for the thumbnail button operation timing, the control unit 13 converts the detection result of presence of the user thumbnail button operation into one point and the detection result of absence of the user thumbnail button operation into zero point. With respect to the parameter value for the extraction frequency, the control unit 13 converts the number of extractions into predetermined points. With respect to the parameter value for the character string size, the control unit 13 converts the numerical value corresponding to the size of various rectangles into points. With respect to the parameter value for the character string position on a screen, the control unit 13 converts the numerical value into points. With respect to the parameter value for the character string recognition accuracy, the control unit 13 uses the ratio of character recognition accuracy as it is.

An evaluation value H can be calculated by the following expression:

$$H = \text{the value for the number of times of detection} \times \{(\text{the thumbnail button user operation value}+1) \times \text{the character recognition accuracy value} \times (\text{the value for the detection timing from the start of the file} + \text{the detection time length value} + \text{the value for the detection timing to the end of the file} + \text{the character string size value} + \text{the value for the character string position on the screen})\}.$$

In step S1108, the control unit 13 stores the thus-calculated evaluation value on the memory unit 14. In step S1109, the control unit 13 compares the stored evaluation values with each other to select an evaluation value X, which is the largest value in the file. Here, an initial evaluation value X is defined as "0". If it is determined in step S1109 that no largest evaluation value X has been selected (NO in step S1109), then the control unit 13 increments "i" by one and returns to step S1101 to repeat the above-described processing.

After having selected the largest evaluation value X, the control unit 13 advances to step S1110. In step S1110, the control unit 13 determines whether a comparison has been performed on all of the character strings in the file.

If it is determined in step S1110 that the largest evaluation value X has been selected (YES in step S1110), then the control unit 13 advances to step S1111. In step S1111, the control unit 13 sets an image including a character string having the largest evaluation value $X_i$ as a thumbnail source image for the moving image file.

For example, in the case where only two character strings, namely, "ABC" (FIG. 2B) and "DEFGH" (FIG. 2C) exist in the file, the evaluation value for the character string "ABC" is 9.2 points and that for the character string "DEFGH" is 5.4 points. Therefore, the character string "ABC" is determined to have the larger evaluation value of the two. Accordingly, the control unit 13 determines the scene in FIG. 2B having the character string "ABC" as a thumbnail source image for the file.

Based on the thumbnail source image having been thus set, the control unit 13, which functions as a thumbnail generation unit, generates a thumbnail. The generated thumbnail is displayed on the display unit 16. Here, if the automatically-set thumbnail is different from the thumbnail that the user desires, the user can select and designate, as a thumbnail, another image having a character string from among images having character strings displayed on the display unit 16 as a list in descending order of the evaluation value.

By performing the above-described processing using the parameter defined by the character information appearance characteristic, the present exemplary embodiment allows a user to appropriately select a thumbnail source image from among a plurality of pieces of image data including a plurality of character strings, without taking the trouble of performing a complicated operation.

In the present exemplary embodiment, it is more useful to use the following expression for calculating the evaluation value H. That is, if the following expression for calculating the evaluation value H is used, the user can select an image having a character string that the user desired to use as a thumbnail, and thus the user can more correctly set the thumbnail.

$H = h \times$ the value for the number of times of detection $\times \{(n \times$ the value for the thumbnail button user operation$+1) \times l \times$ the character recognition accuracy value$\times (x \times$ the value for the timing from the start of the file$+y \times$ the value for the timing to the end of file$+q \times$ the detection time length value$+p \times$ the character string size value$+z \times$ the value for the character string position on screen$)\}$, where "h" and "n" denote a coefficient for a priority degree of extraction frequency, "l" denotes a coefficient for a priority degree of the character recognition accuracy, "x" denote a coefficient for a priority degree of the timing from the start of the file, "y" denote a coefficient for a priority degree of the timing to the end of the file, "q" denote a coefficient for a priority degree of the detection time length, "p" denote a coefficient for a priority degree of the character string size, "z" denote a coefficient for a priority degree of the position of a character string on a screen, and the above-described coefficients "l", "x", "y", "q", "p", and "z" each denote a value for the weight of the character string indicating an appropriateness as a thumbnail.

That is, the user can operate the menu operation button of the operation unit 17 to change which of the above-described parameters are to be prioritized at what degree of priority, to change the value indicating the weight of the character string indicating an appropriateness as a thumbnail.

As described above, by changing the value indicating an appropriateness of the character string as a thumbnail, the user can more correctly select a character string that the user has desired to use as a thumbnail.

Here, it is useful to record the value for the weight of a character string indicating an appropriateness as a thumbnail on the same recording medium as the one storing the data file including the captured image signal (in the present exemplary embodiment, the optical disk 20), thus maintaining a consistency of the thumbnails on one recording medium. Furthermore, the value for the weight of a character string indicating an appropriateness as a thumbnail can be recorded on a recording unit different from the one storing the data file including the captured image signal (for example, a non-volatile memory unit in the video camera (in the present exemplary embodiment, the memory unit 14)). With such a configuration, the consistency of the thumbnails can be maintained in the data file captured by shooting a moving image with the same video camera.

In the case of searching for an image having a character string that has not been used as a thumbnail, it is useful to make a list of character data and display the character data list on the display unit 16 in order of the extraction frequency, the character string size, or the evaluation value. With this configuration, the user can more easily search for a desired scene from among a large number of scenes including character strings. With this configuration, the user can more easily search for a scene including an image having a desired character string from among many character strings included in a large-sized file.

Figure 12:
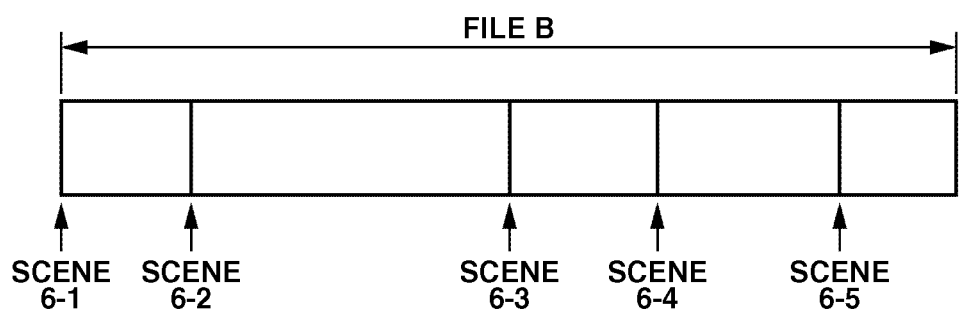
FIG. 12 illustrates an example of one moving image file according to the second exemplary embodiment of the present invention.

FIG. 12 illustrates an example of a file B, which is one moving image file, according to the present exemplary embodiment.

Figure 13:
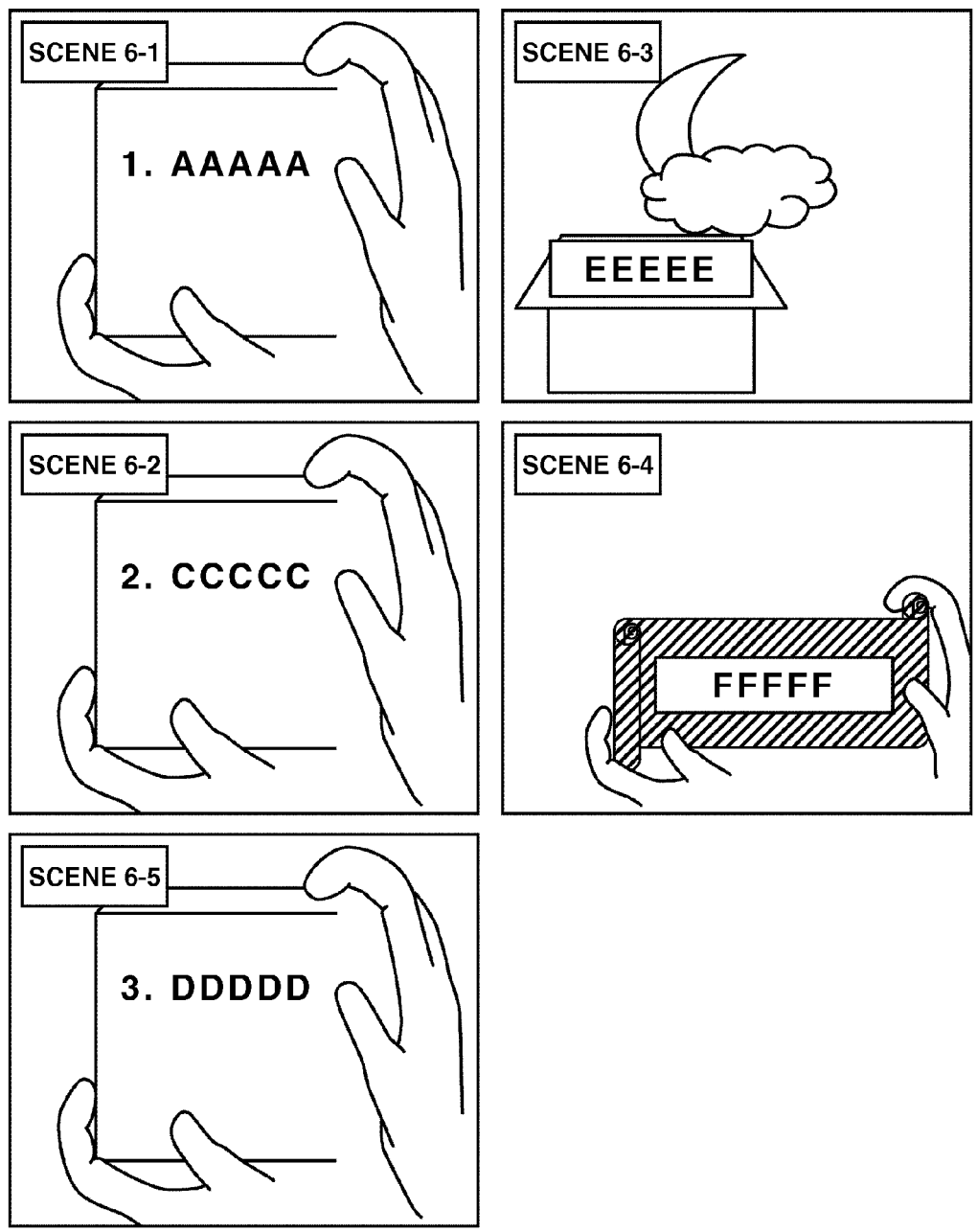
FIG. 13 illustrates an example of a screen of the display unit displaying an image having a character string in each of scenes 6-1 through 6-5 according to the second exemplary embodiment of the present invention.

Referring to FIG. 12, portions "scene 6-1", "scene 6-2", "scene 6-3", "scene 6-4", and "scene 6-5" of the file B each include a corresponding captured scene (scenes 6-1, 6-2, 6-3, 6-4, or 6-5 (FIG. 13)). Each of the scenes 6-1 through 6-5 includes an image having a character string.

The character string evaluation value is larger in the order of the scene 6-1, the scene 6-2, the scene 6-5, the scene 6-4, and the scene 6-3. That is, a character string having the largest evaluation value in the moving image file B is a character string "1. AAAAA" in the scene 6-1. Thus, the thumbnail for the file B is determined to be the scene "1. AAAAA".

Figure 14:
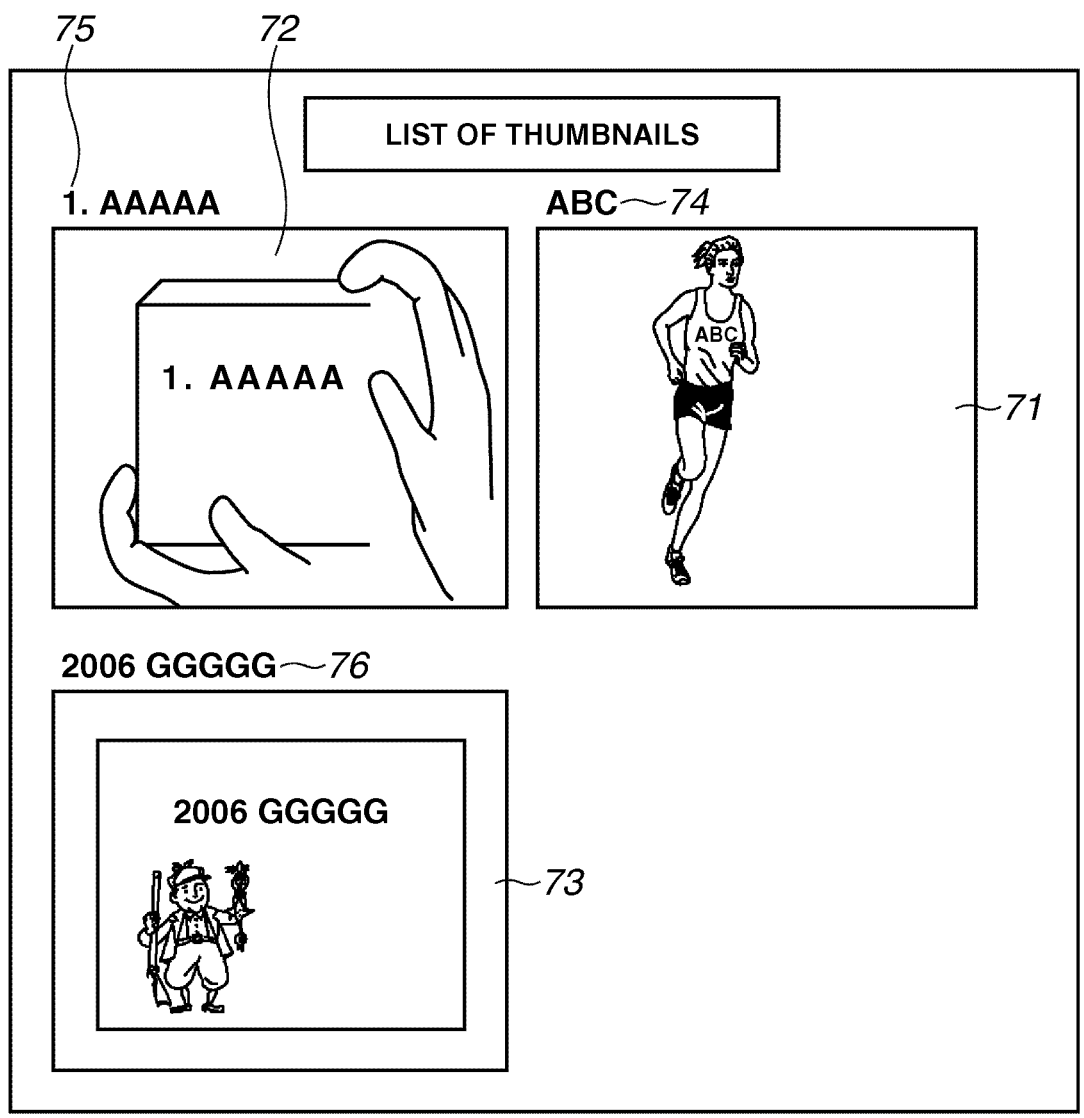
FIG. 14 illustrates an example of a screen of the display unit displaying a list of three thumbnails, which is displayed when a user searches captured images in one file, according to the second exemplary embodiment of the present invention.

FIG. 14 illustrates an example of an image displayed on the display unit 16 of the video camera at the time of searching for an image signal with the control unit 13, which functions as an image signal searching unit, according to the present exemplary embodiment. At the time the user searches the data file, as illustrated in FIG. 14, for example, a thumbnail 71 for a file A, a thumbnail 72 for the file B, and a thumbnail 73 for a file C, each of which has been previously determined in the above-described manner, are displayed on the display unit 16 of the video camera as a list. Here, the size of each thumbnail is very small compared to the size of the screen of the display unit 16 of the video camera. Accordingly, it may be difficult for the user to appropriately verify the content of the data file while looking only at the thumbnail screen.

In this regard, the video camera according to the present exemplary embodiment displays a character string having the largest evaluation value among the character strings in each file, as large-sized text data (text data 74, 75, or 76 (FIG. 14)), together with the thumbnail image. With this configuration, the present exemplary embodiment can allow the user to easily recognize the content of the data file even when the user looks at the small-sized screen of the display unit 16 of the video camera.

The character string displayed together with the thumbnail image is not limited to that based on the evaluation value. That is, the character string can be based on parameters including the detection timing, the thumbnail button user operation timing, the detection time length, the extraction frequency, the character string size, the character string position on a screen, and the character string recognition accuracy. The character string to be displayed together with the thumbnail image can be changed to another character string different from that included in the thumbnail image.

Figure 15:
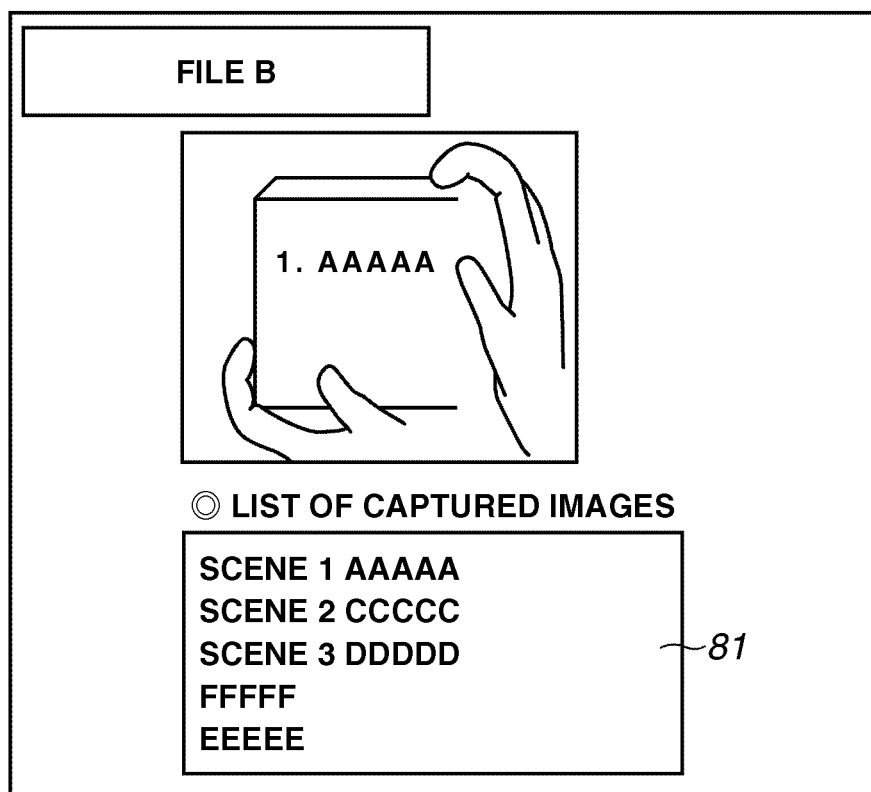
FIG. 15 illustrates an example of a screen of the display unit displaying a list of extracted character strings, which is displayed when a user searches captured images in one file, according to the second exemplary embodiment of the present invention.
Figure 16:
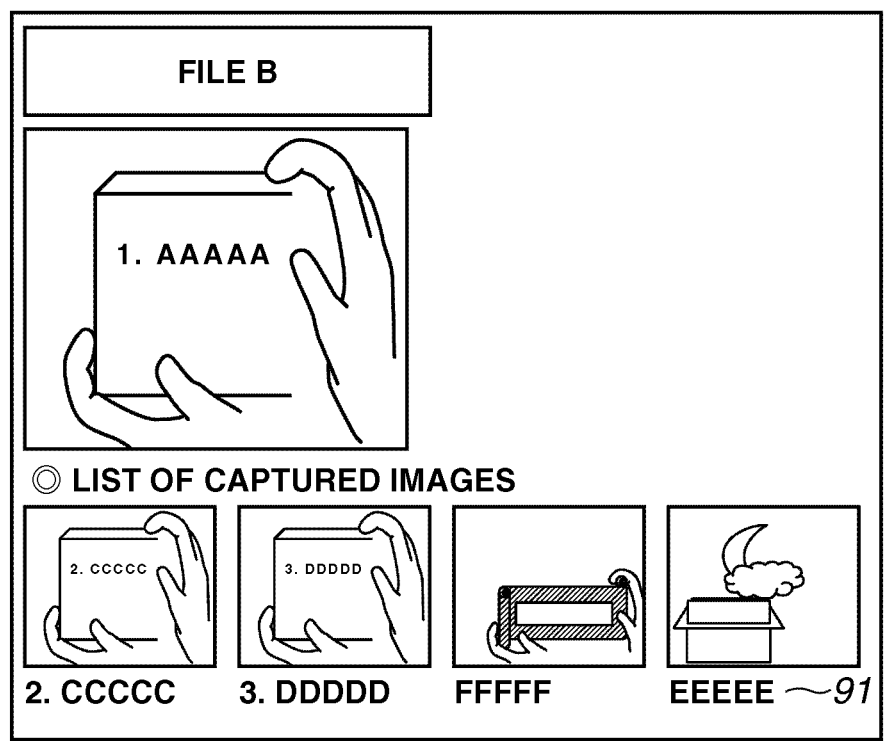
FIG. 16 illustrates another example of a screen of the display unit according to the second exemplary embodiment of the present invention.

Furthermore, in the case of searching the captured images in one file B, the extracted character strings can be listed as in a list field 81 in FIG. 15.

Moreover, by displaying character strings on the display unit 16 as in a list field 91 together with the captured image list, the present exemplary embodiment can allow the user to more easily recognize content of a data file while looking at the screen of the display unit 16. As described above, with the extracted character strings used at the time of a user search, the present exemplary embodiment can allow the user to more easily search for a desired scene.

Other Exemplary Embodiments

Each unit constituting the moving image capture apparatus and each step of the moving image capture method according to the present exemplary embodiment can be implemented by a computer program stored on a random access memory (RAM) or a read-only memory (ROM) of a computer. The program and a computer-readable recording medium storing the program are included in the present invention.

The present invention can be implemented in a system, an apparatus, a method, a program, or a storage medium storing the program, for example. More specifically, the present invention can be applied to a system including a plurality of devices and to an apparatus that includes a single device.

The present invention can be implemented by directly or remotely supplying a program of software implementing functions of the above-described exemplary embodiments (in the exemplary embodiments, the program corresponding to the processing performed according to the flow charts in FIGS. 5, 9, and 11) to a system or an apparatus and reading and executing supplied program code with a computer of the system or the apparatus.

Accordingly, the program code itself, which is installed to the computer for implementing the functional processing of the present invention with the computer, implements the present invention. That is, the present invention also includes the computer program implementing the functional processing of the present invention.

Accordingly, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium, such as a CD-ROM and the like, which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A moving image capture apparatus comprising:
    an imaging unit configured to capture visual information to output an image signal;
    a recording unit configured to record the image signal output by the imaging unit on a recording medium;
    a word recognition unit configured to extract word information from the image signal;
    a parameter value storing unit configured to store with the word information, a parameter value based on a characteristic of appearance of the word information extracted by the word recognition unit;
    an evaluation value calculation unit configured to calculate an evaluation value by using the parameter value stored by the parameter value storing unit for each of the word information;
    an image searching unit configured to search images based on the evaluation value, and display the searched images; and a thumbnail generation unit configured to generate a thumbnail based on an image which includes the word information which has the largest evaluation value of the word information from among the images searched by the image searching unit.

2. The moving image capture apparatus according to claim 1, further comprising:
an operating unit configured to add the evaluation value according to a user's pressing operation during the appearance of the word information.

3. The moving image capture apparatus according to claim 1, wherein the parameter value is stored at least one of a word information detection time length, a word information detection frequency, a word information size, a word information position on a display screen, and a word information recognition accuracy.

4. A method comprising:
capturing visual information to output an image signal;
recording the image signal output on a recording medium;
extracting word information from the image signal;
storing with the word information, a parameter value based on a characteristic of appearance of the word information extracted;
calculating an evaluation value used to by using the parameter value stored for each of the word information;
searching images based on the evaluation value, and display the searched images; and
generating a thumbnail based on an image which the word information which has the largest evaluation value of the word information from among the images searched.

5. The method according to claim 4, further comprising:
adding the evaluation value according to a user's pressing operation during the appearance of the word information.

6. The method according to claim 4, wherein the parameter value is stored at least one of a word information detection time length, a word information detection frequency, a word information size, a word information position on a display screen, and a word information recognition accuracy.

7. A moving image capture apparatus comprising:
an imaging unit configured to capture visual information to output an image signal;
a file generation unit configured to generate a data file to record the image signal output from the imaging unit on a recording medium;
a character recognition unit configured to extract character information from the image signal;
a parameter value setting unit configured to set a parameter value related to a time axis according to a characteristic of appearance of the character information extracted by the character recognition unit within a file;
an evaluation value calculation unit configured to calculate an evaluation value for each of the character information based on the parameter value set by the parameter value setting unit;
an operation member configured to set the parameter value different from the parameter value related to the time axis used for calculating the evaluation value in accordance with a user operation while the character information is appearing during image capturing; and
a thumbnail generation unit configured to generate a thumbnail of the file based on an image signal from which character information for which the calculated evaluation value is greatest has been extracted.

8. A method comprising:
capturing visual information to output an image signal;
generating a data file to record the image signal output on a recording medium;
extracting character information from the image signal;
setting a parameter value related to a time axis according to a characteristic of appearance of the character information extracted within a file;
calculating an evaluation value for each of the character information based on the parameter value set;
setting the parameter value different from the parameter value related to the time axis used for calculating the evaluation value in accordance with a user operation while the character information is appearing during image capturing; and
generating a thumbnail of the file based on an image signal from which character information for which the calculated evaluation value is greatest has been extracted.

* * * * *